United States Patent
Margalit et al.

(10) Patent No.: US 9,876,673 B2
(45) Date of Patent: Jan. 23, 2018

(54) SELF-LEARNING AUTOMATED REMEDIATION OF CHANGES THAT CAUSE PERFORMANCE DEGRADATION OF APPLICATIONS

(71) Applicant: VMware, Inc., Palo Alto, CA (US)

(72) Inventors: Adar Margalit, Modi'in (IL); Eran Dvir, Tel Aviv (IL)

(73) Assignee: VMware, Inc., Palo Alto, CA (US)

( * ) Notice: Subject to any disclaimer, the term of this patent is extended or adjusted under 35 U.S.C. 154(b) by 428 days.

(21) Appl. No.: 14/315,169

(22) Filed: Jun. 25, 2014

(65) Prior Publication Data
US 2015/0381409 A1    Dec. 31, 2015

(51) Int. Cl.
*H04L 12/24*    (2006.01)

(52) U.S. Cl.
CPC ...... *H04L 41/0631* (2013.01); *H04L 41/0672* (2013.01); *H04L 41/0863* (2013.01)

(58) Field of Classification Search
CPC ............ H04L 41/0631; H04L 41/0672; H04L 41/0863
See application file for complete search history.

(56) References Cited

U.S. PATENT DOCUMENTS

| | | | | |
|---|---|---|---|---|
| 5,987,398 A * | 11/1999 | Halverson | ........ | G05B 19/41875 700/275 |
| 6,993,686 B1 * | 1/2006 | Groenendaal | ....... | G06F 11/2023 709/224 |
| 7,774,657 B1 * | 8/2010 | Hardman | ............ | G06F 11/2247 714/33 |
| 7,805,529 B2 * | 9/2010 | Galluzzo | ............... | H04L 67/322 709/227 |
| 8,028,056 B1 * | 9/2011 | Krishna | ............ | G06F 17/30902 709/223 |
| 8,509,968 B1 * | 8/2013 | Saccone | ............ | G05B 13/0205 244/12.1 |

(Continued)

OTHER PUBLICATIONS

Yi-min Yang, Microsoft Corporation, "What has changed on my Machine Lately", Jan. 5, 2004.

(Continued)

*Primary Examiner* — Uzma Alam
(74) *Attorney, Agent, or Firm* — Patterson & Sheridan LLP (57) ABSTRACT

Techniques are disclosed for automatic remediation of application performance degradations caused by configuration changes. In one embodiment, a learning module keeps track of application configuration changes and subsequent effects on the application's performance. The learning module creates new potential remediation rules based on correlations between such configuration changes and performance degradations or improvements. The learning module affirms such potential rules if the correlation between the configuration changes and degradations or improvements are repeatedly observed, and vice versa. When subsequent performance degradations are observed, a rule engine, which maintains a set of remediation rules, evaluates the rules to identify configuration changes relevant to the observed performance degradation and determines whether the probability that the configuration changes caused the degradation are greater than a threshold for invoking a remediation action, such as rolling back the configuration changes.

17 Claims, 5 Drawing Sheets

(56) References Cited

U.S. PATENT DOCUMENTS

| | | | |
|---|---|---|---|
| 9,256,506 B1* | 2/2016 | Taylor | G06F 11/3055 |
| 2002/0161860 A1 | 10/2002 | Godlin et al. | |
| 2005/0155031 A1 | 7/2005 | Wang et al. | |
| 2006/0136510 A1* | 6/2006 | Voronov | G06F 17/24 |
| 2008/0294777 A1 | 11/2008 | Karve et al. | |
| 2009/0177642 A1* | 7/2009 | Chung | G06F 11/3419 |
| 2010/0058313 A1* | 3/2010 | Hansmann | G06F 8/68 717/168 |
| 2010/0218031 A1* | 8/2010 | Agarwal | G06F 11/079 714/2 |
| 2010/0223253 A1* | 9/2010 | Gopal | G06F 17/30306 707/713 |
| 2012/0102189 A1* | 4/2012 | Burge | G06F 9/5083 709/224 |
| 2012/0192172 A1* | 7/2012 | Hansmann | G06F 8/68 717/168 |
| 2012/0324097 A1* | 12/2012 | Myers | G06F 11/3452 709/224 |
| 2013/0232124 A1 | 9/2013 | Gaither | |
| 2013/0332430 A1 | 12/2013 | Margalit et al. | |
| 2013/0332594 A1 | 12/2013 | Dvir et al. | |
| 2014/0136670 A1* | 5/2014 | Tofighbakhsh | H04L 41/0893 709/223 |
| 2014/0236875 A1* | 8/2014 | Phillipps | G06N 99/005 706/12 |
| 2015/0286820 A1* | 10/2015 | Sridhara | G06F 21/566 726/23 |

OTHER PUBLICATIONS

Aravind Menon, Diagnosing Performance Overheads in the Xen Virtual Machine Environment; pp. 13-23, Chicago, IL, USA—Jun. 11-12, 2005.

S. Correa and R. Cerqueira, "Statistical Approaches to Predicting and Diagnosing Performance Problems in Component-Based Distributed Systems: an Experimental Evaluation," 2010 Fourth IEEE International Conference on Self-Adaptive and Self-Organizing Systems, Budapest, 2010, pp. 21-30.

Diagnosing underground explosions and earthquakes Thirlaway, H.I.S., Contemporary Physics 9.1 (Jan. 1968: 17-31.

Robert P. Smith, Identifying Controlling Features of Engineering Design Iteration, 1997, p. 26-293.

Office Action dated Dec. 18, 2015 for U.S. Appl. No. 13/491,329.

Office Action dated Aug. 13, 2013 for U.S. Appl. No. 13/491,305.

Final Office Action dated Dec. 6, 2013 for U.S. Appl. No. 13/491,305.

Final Office Action dated Jul. 22, 2016 for U.S. Appl. No. 13/491,329.

Office Action dated Jun. 16, 2014 U.S. Appl. No. 13/491,305.

Office Action dated Sep. 4, 2015 for U.S. Appl. No. 14/612,986.

Final Office Action dated Jan. 25, 2016 for U.S. Appl. No. 14/612,986.

Office Action dated Apr. 7, 2014 for U.S. Appl. No. 13/491,329.

Final Office Action dated Nov. 21, 2014 for U.S. Appl. No. 13/491,329.

* cited by examiner

SELF-LEARNING AUTOMATED REMEDIATION OF CHANGES THAT CAUSE PERFORMANCE DEGRADATION OF APPLICATIONS

BACKGROUND

With the transition to virtualized infrastructure in recent years, outages due to configuration changes to applications have been on the rise. Some of the more common configuration changes include code push, and changes to the clustering configuration, number of threads allocated to applications, and datastore configuration. Although many of these changes are tested prior to rolling them out in the production environment, outages and significant performance degradations are not discovered, indeed cannot be discovered, if they result from scale issues, e.g., when the changes are rolled out in a cloud environment having virtual machines that number in the thousands.

Approaches for tracking configuration changes and correlating performance degradations to specific, application-related changes are disclosed in U.S. Patent Application Publication No. 2013/0332430, entitled "Tracking Changes that Affect Performance of Deployed Applications," and U.S. Patent Application Publication No. 2013/0332594, entitled "Correlating Performance Degradation of Applications to Specific Changes Made to Applications," which are hereby incorporated by reference in their entireties. However, these approaches require human input to identify configuration changes and remedy performance degradation.

SUMMARY

One or more embodiments disclosed herein provide an application monitoring infrastructure that enables performance degradations, including outages, to be remedied by automatically determining application configuration changes that cause the performance degradations and outages and taking remedial action.

A method for remedying performance degradation of an application deployed in a computer system, according to an embodiment, includes the steps of receiving notification of the performance degradation; identifying configuration changes to the application, the configuration changes being associated with the performance degradation; determining, based on learned rules for the application, whether each of the identified configuration changes satisfies a corresponding probability threshold indicating that the configuration change caused the performance degradation; and reconfiguring the application if one or more of the configuration changes satisfies the corresponding probability thresholds.

Further embodiments of the present invention include, without limitation, a non-transitory computer-readable storage medium that includes instructions that enable a computer system to implement one or more aspects of the above methods as well as a computer system configured to implement one or more aspects of the above methods.

DETAILED DESCRIPTION

Embodiments disclosed herein provide automatic remediation of application performance degradation caused by configuration changes. In one embodiment, a learning module keeps track of application configuration changes and subsequent effects on the application's performance. The learning module creates new potential rules based on correlations between configuration changes and performance degradations or improvements. Further, the learning module affirms potential rules if the correlation between the configuration changes and degradations or improvements are repeatedly observed, and vice versa, until the potential rule is sufficiently affirmed to be made an actual rule used to remedy degradation, or the potential rule is removed after being repeatedly rejected. When subsequent performance degradations are observed, a rule engine, which maintains the set of remediation rules, evaluates the rules to identify configuration changes relevant to the observed performance degradation and determines whether the probability that the configuration changes caused the degradation (as opposed to merely being correlated with the degradation) are greater than a threshold for invoking a remediation action, such as rolling back the configuration changes.

Figure 1:
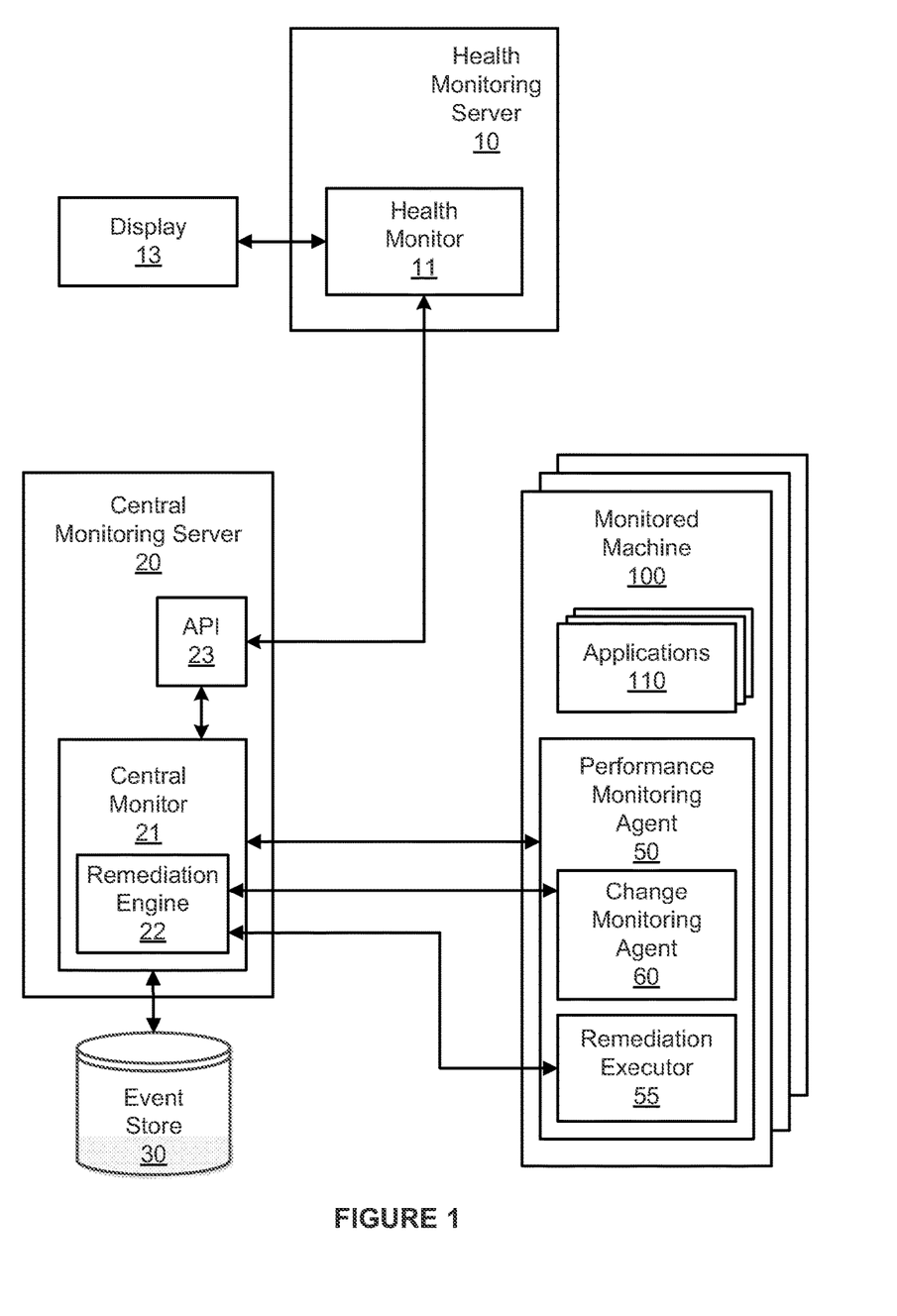
FIG. 1 is a simplified diagram of a computing environment in which one or more embodiments may be practiced.

FIG. 1 is a simplified diagram of a computing environment in which one or more embodiments may be practiced. In one embodiment, the computing environment is a cloud computing environment that includes a plurality of physical computing devices ("physical machines") networked together and managed by an entity such as a cloud controller. The diagram of FIG. 1 illustrates components of the computing environment that monitor the performance of various applications and physical machines deployed therein. The monitoring components include a health monitoring server 10 and a central monitoring server 20. Central monitoring server 20 collects performance and change data from a plurality of monitored machines 100, and health monitoring server 10 accesses such data and displays them to a system administrator, e.g., through a graphical user interface (GUI). An example of health monitoring server 10 is VMware vCenter Operations Manager, which is commercially available from VMware, Inc. of Palo Alto, Calif. An example of central monitoring server 20 is VMware vCenter Hyperic, which is also commercially available from VMware, Inc. It should be recognized that, in alternative embodiments, the functions of health monitoring server 10 and central monitoring server 20 described herein may be carried out by a single server.

Each of health monitoring server 10, central monitoring server 20, and monitored machines 100 includes hardware components of a conventional computing device, such as processor and system memory, and system level software. Health monitoring server 10 further includes software components running on top of its system level software, one of which is shown in FIG. 1 as health monitor 11. Health monitor 11 communicates with central monitoring server 20 over a network to retrieve application performance data and change data from central monitoring server 20 through an application programming interface (API) 23. Health monitor 11 also processes the retrieved performance data and change data to generate various GUIs that are presented to the system administrator through a display 13.

Central monitoring server 20 further includes software components running on top of its system software, which are shown in FIG. 1 as central monitor 21 and API 23. Central monitor 21 communicates with monitored machines 100 to collect application performance and change data from them, store such data in an event store 30, make the data available to health monitor 11 through API 23, and learn and apply rules to remedy performance degradation caused by application configuration changes. Illustratively, central monitor 21 includes a remediation engine 22 which takes as inputs configuration change and application performance data and learns rules for remedying performance degradations, as discussed in greater detail below.

Remediation engine 22 is in communication with a remediation executor module 55 of a performance monitoring agent 50 running in monitored machine 100. Monitored machine may be rolled back to the most recent snapshot that was taken prior to the point in time performance degradation was observed.

Figure 2:
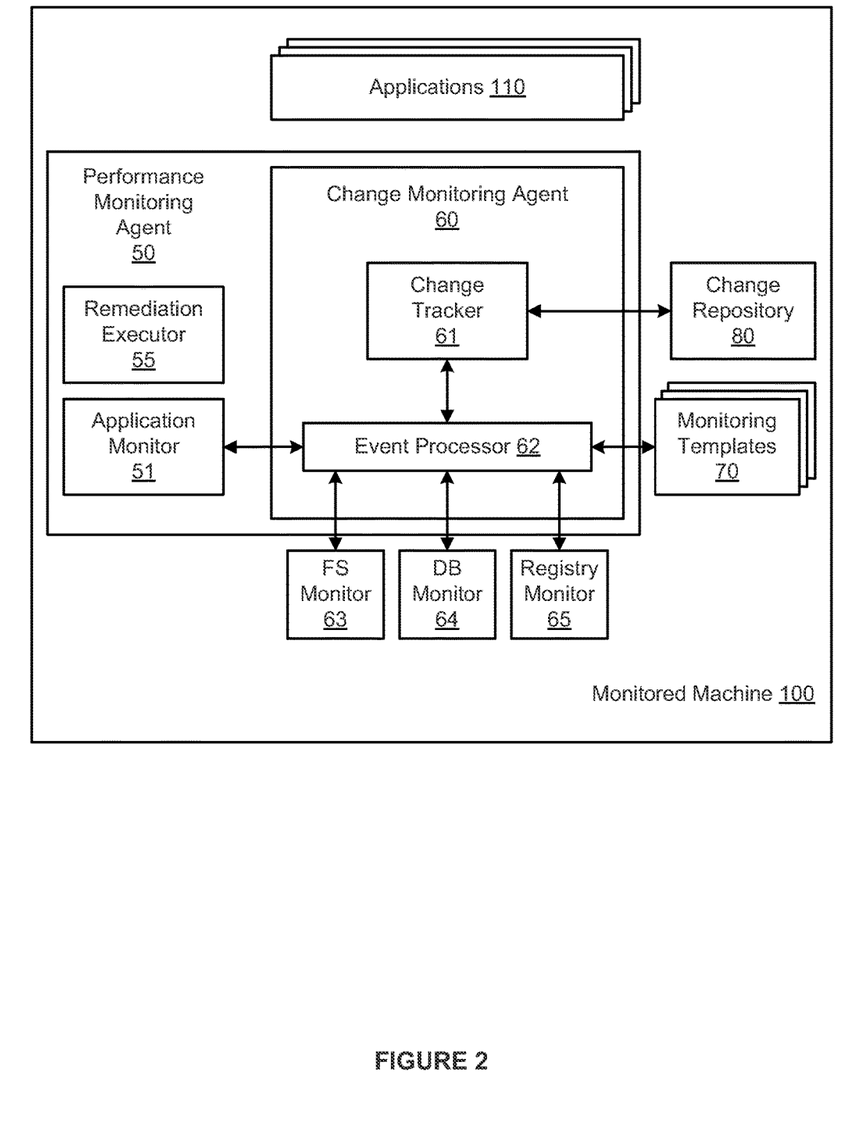
FIG. 2 is a conceptual diagram that illustrates various software components of a monitored machine that enable tracking of changes made to applications running in the monitored machine, according to an embodiment.

FIG. 2 is a conceptual diagram that illustrates various software components of a monitored machine that enable tracking of configuration changes made to applications 110 running in the monitored machine, according to an embodiment. Examples of configuration changes include code push, and changes to the clustering configuration, memory allocation, number of threads allocated to applications, and datastore configuration. The presence of applications 110 running in monitored machine 100 is discovered through application monitor 51, which keeps track of installed applications. Applications 110 running in monitored machine 100 may be designated for performance monitoring and change tracking according to embodiments described herein, and each application that is designated for such monitoring and change tracking has a monitoring template 70 associated therewith. Monitoring templates 70 are stored and maintained in a persistent storage device of monitored machine 100, and for efficient access, may be cached in system memory of monitored machine 100. A sample monitoring template is illustrated in TABLE 1.

TABLE 1

```
<plugin package="org.hyperic.hq.plugin.tomcat" name="tomcat" version="@project.version@">
   <metrics name="Some_metrics">
      </metrics>
      <server name="Apache Tomcat" version="5.5" platforms="Unix,Win32">
         <property name="VERSION_FILE" value="server/lib/catalina-storeconfig.jar"/>
         <plugin type="config_track" class="org.hyperic.hq.product.FileChangeTrackPlugin">
            <monitored>
               <folder path="conf" recursive="true" filter=".*.properties|.*.xml|.*.policy"/>
               <folder path="bin" recursive="false" filter=".*.bat|.*.xml|.*.sh"/>
               <folder path="lib" recursive="false" filter=".*.jar"/>
               <folder path="webapps" recursive="true"
filter=".*\.jar|.*\.dll|.*\.class|.*\.jsp|.*\.php|.*\.pl|.*\.js|.*\.py|.*\.pyc|.*\.cgi"/>
               <folder path="data" recursive="false" filter=".*\.conf"/>
               <!-- system variable PGDATA -->
               <folder path="%PGDATA%" recursive="false" filter=".*\.conf"/>
            </monitored>
         </plugin>
      </server>
</plugin>
``` machines 100 may be physical or virtual machines. Physical machines include any computing device, such as server-grade computing platforms, desktop and laptop computing devices, and mobile computing devices, such as tablet computers and smart phones. Each of monitored machines 100 includes one or more applications 110 running on top of its system software, as well as performance monitoring agent 50 that monitors the performance of applications 110, such as central processing unit (CPU) usage, physical memory usage, and latency, and a change monitoring agent 60 that monitors changes to various files and folders designated by the system administrator as being monitoring targets. Some examples of applications that can be tracked include web server applications such as Tomcat, JBoss, Websphere, Weblogic, and IIS, and database applications such as MySQL, PostgreSQL, Oracle, and MSSQL. When a performance degradation is reported to remediation engine 22, remediation engine 22 applies its learned rules to determine whether remediation action needs to be taken. If such remediation action is required, remediation engine 22 requests that remediation executor module 55 carry out the remediation, which may include rolling back configuration changes. If the monitored machine is a virtual machine, as an alternative to the pinpoint rolling back, the entire virtual Monitoring template 70 for an application identifies the application being monitored, and paths of folders and files to be monitored, some recursively, for that application. In the example given in TABLE 1, the application being monitored is "Apache Tomcat" and the folders and files that are to be monitored recursively have a recursive flag set to be true. Some folders and files within a monitored folder may be expressly excluded from monitoring, and to do so, they are expressed as values of the key "filter." In addition, monitoring template 70 may designate folders and files to be monitored using environmental or system variables so that files that affect the performance of the application but reside in a system folder may be monitored and tracked according to embodiments described herein. Using monitoring template 70, the folders and files for any application being monitored may be custom defined. By using monitoring template 70, the number of folders and files to be monitored can be reduced to a manageable (practical) number.

Change monitoring agent 60 monitors changes to various files and folders of particular applications 110 being monitored as specified in monitoring templates 70. As shown, change monitoring agent 60 includes two modules. The first is an event processor 62 that receives notifications from the system software of monitored machine 100 that a certain folder or file has been changed. The particular components of system software that are providing the notifications are a file system (FS) monitor 63, a database (DB) monitor 64, and for Microsoft Windows® systems, a registry monitor 65. In one embodiment, a Java® library known as "jpath-watch" is used to monitor file system changes such as file creation and deletion, file modification, file renaming, and changes in subfolders. Event processor 62 evaluates the changes detected by FS monitor 63, DB monitor 64, and registry monitor 65 and produces change events for further processing by change tracker 61, which is the second module within change monitoring agent 60 shown in FIG. 2. Techniques for generating and processing change events are discussed in U.S. Patent Application Publication No. 2013/0332430, entitled "Tracking Changes that Affect Performance of Deployed Applications," and U.S. Patent Application Publication No. 2013/0332594, entitled "Correlating Performance Degradation of Applications to Specific Changes Made to Applications." Change tracker 61 receives change events from event processor 62 and processes the versioning of the changes to files using a versioning tool to store any changes to the files in change repository 80, which may be provisioned in system memory or local storage. In one embodiment, the versioning tool known as Git is used.

Change monitoring agent 60 transmits changes to the files to central monitor 21, which makes such information available to users via health monitor 11 and also performs automatic remediation where configuration changes are determined to cause performance degradation. As discussed in greater detail below, central monitor 12 includes a remediation engine 22 which learns remediation rules and applies those rules to determine whether remediation actions should be taken to reduce performance degradation caused by configuration changes. If remediation engine 22 determines that remediation actions should be taken, remediation engine 22 transmits request(s) to remediation executor 55 to take specific actions, such as rolling back changes to the application files.

Figure 3:
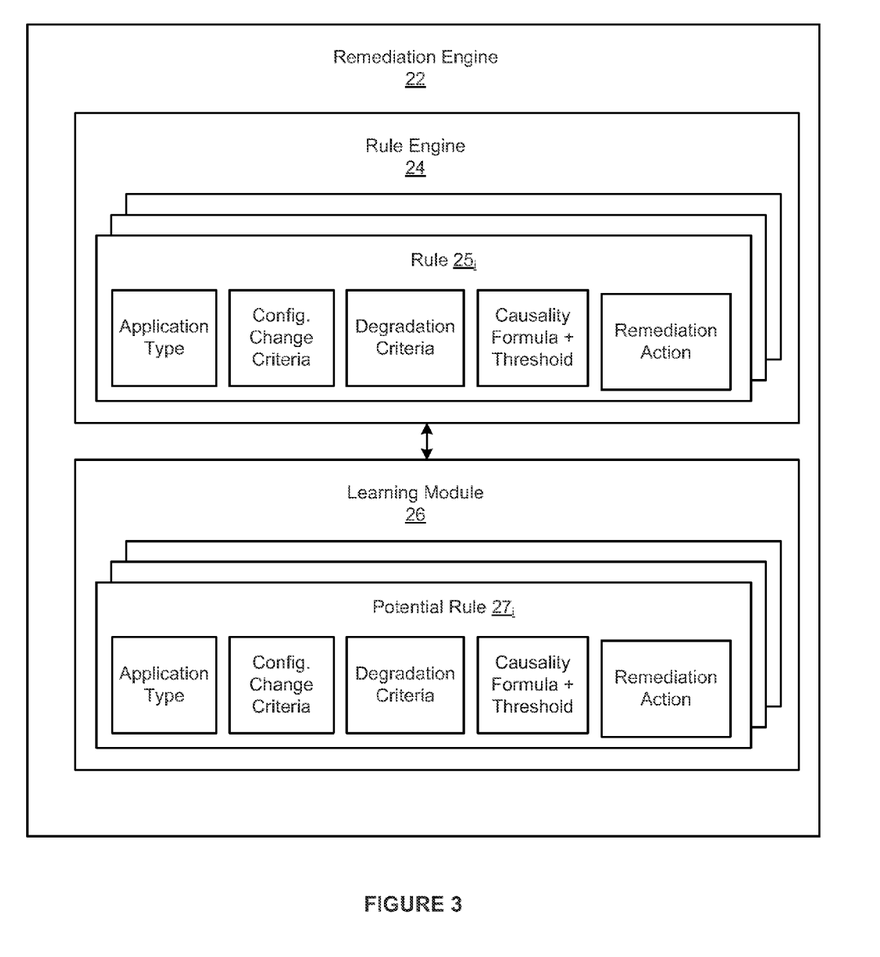
FIG. 3 is a conceptual diagram that illustrates various software components of a remediation engine that enable learning and application of remediation rules, according to an embodiment.

FIG. 3 is a conceptual diagram that illustrates various software components of remediation engine 22 that enable learning and application of remediation rules, according to an embodiment. As shown, remediation engine 22 includes a rule engine 24 and a learning module 26. Rule engine 24 maintains a set of rules $25_i$ and applies those rules $25_i$ to determine whether observed performance degradations are caused by application configuration changes and, if such is the case, to request that remediation executor 55 carry out appropriate remediation action(s).

As shown, rules $25_i$ each include a value (e.g., an ID) for an application type, configuration change criteria, degradation criteria, a causality formula and threshold, and a remediation action. It should be recognized that more complicated rules may include additional criteria and parameters, and some rules may also include sub-rules. Illustratively, the application type specifies the type of application to which the rule is applicable. As discussed, example applications include web server applications such as Tomcat, JBoss, Websphere, Weblogic, and IIS, and database applications such as MySQL, PostgreSQL, Oracle, and MSSQL. The configuration change criteria specify specific configuration variable(s) and a formula for determining whether the configuration change should be considered substantial. For example, one configuration variable may be amount of memory allocated to the application, and the formula may specify that a change memory allocation that exceeds a certain percentage threshold should be considered substantial. The degradation criteria specify performance metric(s) which may be affected, criteria for determining whether a degradation of the metric(s) has occurred, and a maximum time gap between the configuration change and the degradation for causality to be inferred. Continuing the example above in which memory allocation is changed, the degradation criteria may include a decreased percentage of free memory and a certain rate of page faults, the criteria for determining whether degradation has occurred may indicate a minimum free memory threshold or percentage, and a high rate of page faults. The maximum time gap may be a maximum time in seconds between the memory allocation change and the minimum free memory and maximum page faults thresholds being crossed. The formula for determining probability that degradation is caused by a configuration change, and the threshold probability, may be determined experimentally and will generally vary across applications. Similarly, the remediation action will generally depend on the application. However, a default remediation action may simply be to roll back the configuration change specified in the configuration change criteria.

Learning module 26 is responsible for learning new rules and verifying that existing rules work as expected when applied to remedy performance degradations. Initially, a user (e.g., a system administrator) may provide a number of default rules. Rules could also be provided out-of-band (OOB), or obtained from a central rule repository. As such rules are applied to remedy performance degradations, learning module 26 verifies that the rules are effective and ranks the rules higher or lower based on their efficacy. A rule that is ranked too low may eventually be removed.

In addition to verifying existing rules, learning module 26 may learn new rules based on observed correlations between configuration changes and performance improvements or degradations. For example, learning module 26 may determine that a user configuration change is correlated with a particular performance degradation and that, after the user changes the configuration settings back or adjusts the configuration settings, the performance degradation is resolved. In response to such observations, learning module 26 may generate a potential rule $27_i$ that specifies that the configuration change causes the performance degradation and that a potential remediation action is the same action the user took. Similar to actual rules $25_i$, each potential rule $27_i$ may include a value (e.g., an ID) for an application type, configuration change criteria, degradation criteria, a causality formula and threshold, and a remediation action. If the potential rule is affirmed multiple times, learning module 26 may add the potential rule to the rules $25_i$ maintained by rule engine 24. In one embodiment, rule affirmation is enhanced with a central rule repository to which multiple remediation engines synchronize rules. In such a case, observations by the multiple remediation engines can be used together to affirm or reject potential rules.

Figure 4:
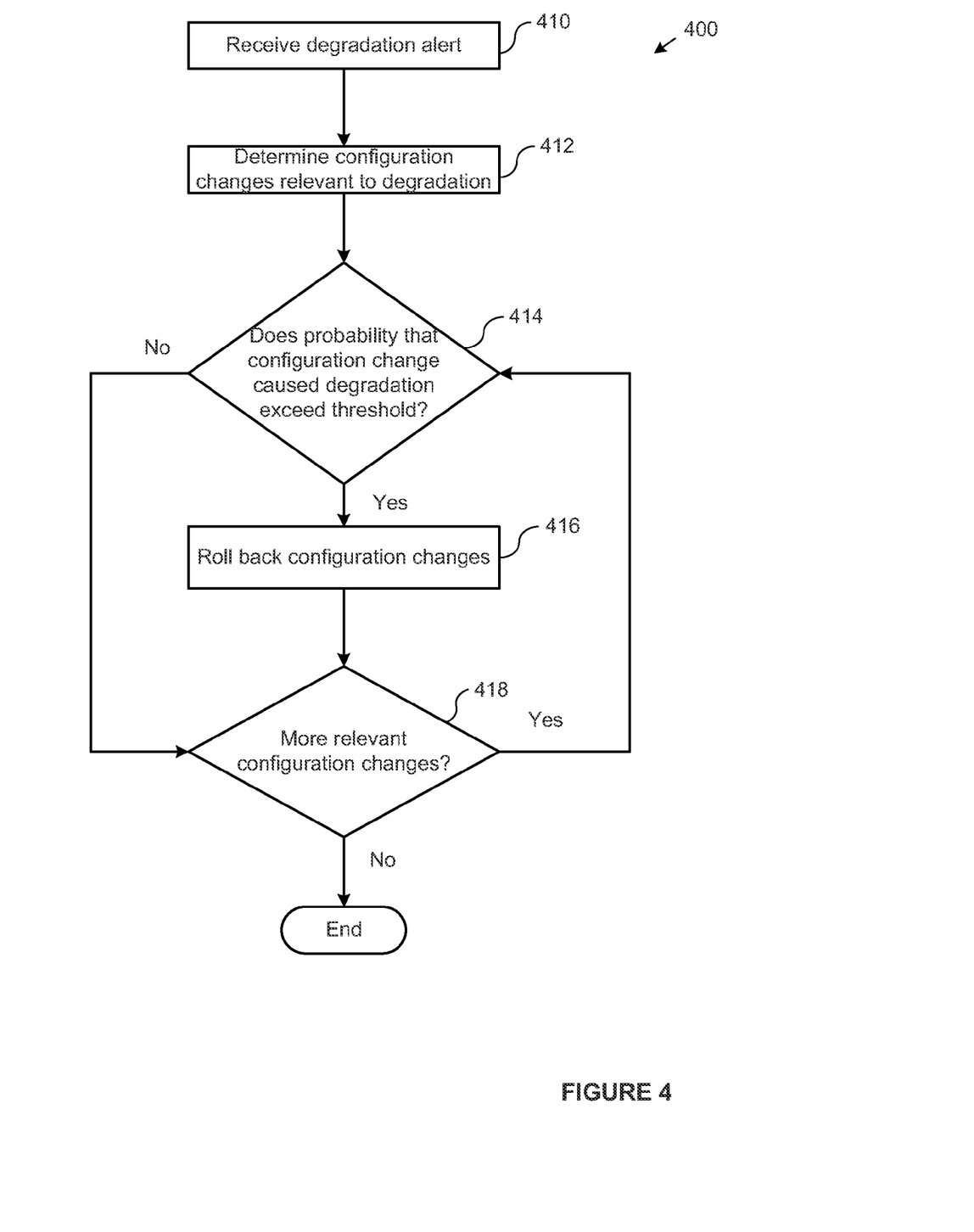
FIG. 4 is a flow diagram of a method for applying remediation rules to roll back configuration changes that cause degradations, according to an embodiment.

FIG. 4 is a flow diagram of a method 400 for applying remediation rules to roll back configuration changes that cause degradations, according to an embodiment. The method 400 begins at step 410, where remediation engine 22 receives a degradation notification. The degradation notification may indicate a performance metric, such as CPU usage, free memory, latency, etc. that has degraded and the amount of the degradation, among other things. Such notifications may be triggered by the degradation exceeding a threshold. For example, where a configuration change reduces the memory allocated to an application, and percentage of free memory for that application falls below a given threshold and the rate of page faults exceeds another threshold, then performance monitoring agent 50 may issue a notification. In one embodiment, degradation notifications may be set up by learning module 26 based on the degradations specified by learned rules $25_i$.

At step 412, remediation engine 22 evaluates learned rules $25_i$ to identify configuration changes that are relevant to the degradation. As discussed, each rule $25_i$ may include degradation criteria and configuration change criteria. The degradation criteria specify performance metric(s) affected, criteria on what constitutes a degradation on the metric(s), and a maximum time gap between a configuration change and degradation. The configuration change criteria specify configuration variable(s), as well as a formula for calculating whether the configuration change should be considered substantial. To identify relevant configuration changes, remediation engine 22 first determines whether the degradation criteria of a rule $25_i$ is satisfied by the degradation reported in the notification. If the degradation criteria are satisfied, remediation engine 22 then determines application configuration changes that occur less than the maximum time gap from the degradation and satisfy the configuration change criteria, namely being one of the explicit configuration variable(s) specified by the rule $25_i$ and being a substantial configuration change. Continuing the example above in which a notification is received indicating low free memory and a high rate of page faults, remediation engine 22 evaluates rules $25_i$, and, in particular, the degradation and configuration change criteria therein, to determine whether the free memory/page faults degradation meets the degradation criteria of any of the rules $25_i$ and, if so, whether any configuration changes that occurred within a given amount of time of the free memory/page faults degradation (e.g., reducing memory allocated to the application) meet the configuration change criteria of the rule.

At step 414, remediation engine 22 determines whether the probability that one of the configuration changes identified at step 412 caused the degradation exceeds a threshold. As discussed, each of the rules $2_{5i}$ includes a formula for determining the probability that a degradation that satisfies its degradation criteria is caused by a configuration change satisfying its configuration change criteria, as well as a probability threshold for acting on the determined probability. Remediation engine 22 evaluates this formula and compares the result to the probability threshold to determine whether the threshold is exceeded, indicating a sufficiently high probability that the configuration change caused the performance degradation. Doing so helps ensure that remediation actions are only taken for configuration changes which have caused the degradation, and not for unrelated configuration changes.

If remediation engine 22 determines that the probability exceeds the threshold at step 414, then at step 416, remediation engine 22 requests that remediation executor 55 roll back the configuration change. Rolling back the configuration change may be the default remediation action that is taken. Alternatives to rolling back the configuration change may include modifying the configuration settings in such a way as to reduce or eliminate the performance degradation, or, in a virtual environment, allocating more resources.

After the remediation engine rolls back the configuration change at step 416, or if the probability does not exceed the threshold at step 414, the remediation engine determines at step 418 whether there are more relevant configuration changes. If there are more relevant configuration changes, determined by evaluating other remediation rules, then the method 400 returns to step 414, where the remediation engine determines whether the probability that another configuration change caused the degradation exceeds a threshold.

Figure 5:
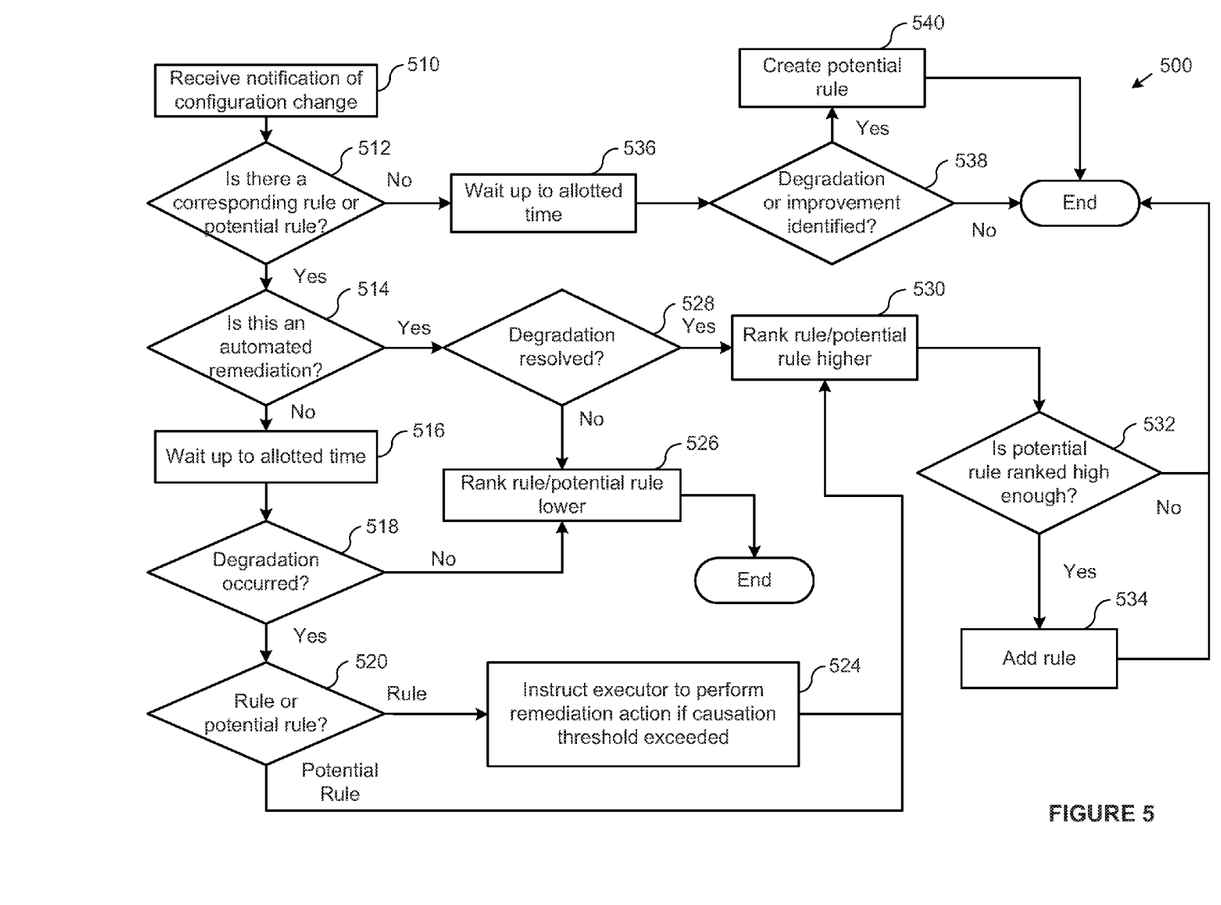
FIG. 5 is a flow diagram of a method for verifying existing remediation rules and learning new remediation rules, according to an embodiment.

FIG. 5 is a flow diagram of a method 500 for verifying existing remediation rules and learning new remediation rules, according to an embodiment. As shown, the method 500 begins at step 510, where learning module 26 receives notification of a configuration change that has been detected. As discussed, configuration changes are tracked by change monitoring agent 60, which transmits configuration change information to remediation engine 21.

At step 512, learning module 26 determines whether there is a rule or potential rule corresponding to the change. As discussed, each rule $25_i$ includes configuration change criteria specifying configuration variable(s), as well as a formula for calculating whether the configuration change should be considered substantial. If the configuration change meets the configuration change criteria of one of the rules $25_i$ or of a potential rule and is substantial, then such a rule or potential rule corresponds to the change.

If there is a rule or potential rule corresponding to the change, then at step 514, learning module 26 determines whether the configuration change is an automated remediation action. Automated remediation actions are actions, such as rolling back a configuration change, that remediation engine 22 has itself initiated. As discussed, remediation engine 22 may include rule engine 24 that maintains a set of rules $25_i$ and evaluates those rules to determine configuration changes that cause performance degradation and triggers appropriate remediation actions, e.g., rolling back the configuration changes. Such remediation actions are also configuration changes that may be detected by change monitoring agent 60.

If learning module 26 determines that the configuration change is the result of an automated remediation action, then at step 528, learning module 26 determines whether the performance degradation that the automated remediation action was taken to resolve has actually been resolved. For example, if the performance degradation was low free memory and high rate of page faults, then learning module 26 may determine whether the amount of free memory has increased and the number of page faults has gone down as a result of the automated remediation action. If the degradation has been resolved, then at step 530, learning module 26 ranks the rule or potential rule that activated the automated remediation higher. Conversely, if the degradation has not been resolved, then learning module 26 ranks the rule or potential rule lower at step 526. Rules and potential rules may be ranked in any feasible manner, such as by assigning numerical values to the rules. As discussed in greater detail below, a potential rule that becomes ranked high enough (e.g., the numerical value assigned to the rule exceeds a given threshold) may be elevated to an actual rule used in remediation. Conversely, an actual rule that becomes ranked low enough (e.g., the numerical value assigned to the rule dips below a given threshold) may be reduced to a potential rule or removed altogether.

If the configuration change is not an automated remediation action, then at step 516, learning module 26 waits up to an allotted time to see if performance degradation occurs. More specifically, learning module 26 waits for degradation consistent with the degradation criteria of the rule(s) or potential rule(s) determined at step 512 to occur. At step 518, learning module 26 determines whether performance degradation occurs based on degradation notifications received from performance monitoring agent 50. If no degradation occurs, then learning module 26 ranks the remediation rule(s) or potential rule(s) determined at step 512 lower. This is because a configuration change was observed corresponding to the rule(s) or potential rule(s), but no degradation occurred and thus no remediation was necessary. Eventually, a rule that is ranked too low may be removed from the set of rules $25_i$ that are used in remediation, reduced to a potential rule, or the like.

If degradation occurs, however, then learning module 26 further determines at step 520 whether such degradation meets the degradation criteria of rule(s) or potential rule(s) determined at step 512. That is, the learning module compares the observed degradation against degradation criteria of the rule(s) or potential rule(s) to identify applicable rule(s) or potential rule(s). If the degradation criteria is met for one or more rule(s), then at 524, rule engine 24 evaluates those rule(s) and determines whether a probably threshold for causation is exceeded, and, if such is the case, learning module 26 instructs remediation executor 55 to take remediation action(s) specified by the rule(s), according to the method 400 discussed above. Then at step 530, learning module 26 ranks the rule(s) higher. This is an affirmation that the rule(s) identify a particular configuration change or changes that cause particular performance degradation. In addition to ranking the rule(s) higher, learning module 26 may also learn and/or modify the functions and thresholds in the rule(s), such as the causation probability function and the causation threshold value.

Returning to step 520, if learning module 26 determines that the degradation criteria is met for one or more potential rule(s), then at step 530, learning module 26 ranks the potential rule(s) higher. Learning module 26 may also learn and/or modify the functions and thresholds in the potential rule(s), such as the causation probability function and the causation threshold value. If a potential rule becomes ranked high enough, as determined by learning module 26 at step 532, then at step 534, learning module 26 activates the potential rule by adding the potential rule to the set of rules $25_i$ actively used to remedy performance degradations.

Returning to step 512, if learning module 26 determines that there is no rule or potential rule corresponding to the configuration change, then at step 536, learning module 26 waits for up to an allotted time. Then, at step 538, learning module 26 determines whether a degradation or improvement occurs that is correlated with the configuration change. Correlation may be determined based on the amount of time between the configuration change and the observed degradation, as well as the types of configuration change and degradation, among other things. The types of configuration change and degradation are important because, to better infer causation, learning module 26 should have some semantic understanding of what the change and degradation represent. For example, if memory allocated to an application is reduced, and shortly thereafter (e.g., within some time threshold) a significant reduction in the percentage of free memory is observed and the rate of page faults increases, then learning module 26 may conclude that the observed degradation is correlated with the configuration change. It should be understood that learning module 26 accounts for the fact that the configuration change and degradation are both associated with memory in making the correlation determination.

If learning module 26 determines at step 538 that degradation has occurred or that an improvement has occurred, learning module 26 creates a potential rule at step 540. The potential rule that is created includes degradation and configuration change criteria for identifying degradations and configuration changes similar to those just observed, as well as a remediation action. For example, if an improvement is observed as a result of a configuration change that involved a user rolling back (or modifying) a previous configuration change that caused a performance degradation, then learning module 26 may create a potential rule with degradation and configuration change criteria specifying the previous configuration change and subsequent performance degradation. Further, the potential rule may include the latest configuration change that produced the performance improvement as a remediation action.

Advantageously, techniques disclosed herein permit tracking of application configuration changes and performance degradations, as well as automated remediation actions. As a result, outages and performance degradations that arise from configuration changes and, in particular, problems such as degradations resulting from scale issues that are not easily identifiable during testing, can be remedied automatically at runtime.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for remedying performance degradations of an application deployed in a computer system, said method comprising:
    learning one or more rules applicable to remedy performance degradations of the application, wherein the learning of each of the rules includes:
        identifying a correlation between an observed configuration change and an observed degradation or improvement in performance of the application,
        creating, based on the identified correlation, a potential rule not applied to remedy performance degradations, wherein the potential rule specifies at least the application, configuration change criteria determined based on the observed configuration change, and at least one of degradation criteria or a remediation action determined based on the observed degradation or improvement, respectively, and
        promoting the potential rule to a rule actively applied to remedy performance degradations in response to a ranking of the potential rule satisfying a threshold value based on repeated observations of the correlation between the configuration change and the performance degradation or improvement;
    receiving notification of a first performance degradation;
    identifying, based on configuration change criteria and degradation criteria in the learned rules, one or more configuration changes to the application relevant to the first performance degradation;
    determining, based on one or more of the learned rules, whether each of the identified configuration changes satisfies a corresponding probability threshold indicating that the configuration change caused the first performance degradation; and
    reconfiguring the application based on one or more remediation actions specified in one or more of the learned rules if one or more of the identified configuration changes satisfies the corresponding probability thresholds.

2. The method of claim 1,
    wherein a ranking of a given rule or potential rule is increased if a correlation between a configuration change and a degradation or improvement in performance associated with the given rule or potential rule is repeatedly observed,
    wherein the ranking of the given rule or potential rule is decreased if the correlation between the configuration change and the degradation or improvement in performance associated with the given rule or potential rule is not repeatedly observed,
    wherein the given potential rule is promoted to a rule actively used to remedy performance degradations if the ranking of the given potential rule exceeds a first threshold value, and
    wherein the given rule is removed from a set of rules actively used to remedy performance degradations if the ranking of the given rule falls below a second threshold value.

3. The method of claim 1, wherein learning the rules further includes verifying that applying the rules when associated performance degradations are observed results in expected performance improvements.

4. The method of claim 1, wherein the observations of the correlation between the configuration change and the degradation or improvement in performance are aggregated observations for multiple instances of the application.

5. The method of claim 1, wherein the observed configuration change is a user configuration change that undoes a previous configuration change.

6. The method of claim 1, wherein reconfiguring the application includes rolling back the one or more identified configuration changes when the corresponding probability thresholds are satisfied.

7. The method of claim 1, wherein each of the learned rules includes configuration change criteria and degradation criteria that need to be met for the rule to apply, a formula for determining probability that one or more degradations are caused by one or more configuration changes, and a probability threshold for taking remediation action to reconfigure the application.

8. A non-transitory computer readable storage medium comprising instructions to carry out a method for remedying performance degradations of an application deployed in a computer system, said method comprising:
    learning one or more rules applicable to remedy performance degradations of the application, wherein the learning of each of the rules includes:
        identifying a correlation between an observed configuration change and an observed degradation or improvement in performance of the application,
        creating, based on the identified correlation, a potential rule not applied to remedy performance degradations, wherein the potential rule specifies at least the application, configuration change criteria determined based on the observed configuration change, and at least one of degradation criteria or a remediation action determined based on the observed degradation or improvement, respectively, and promoting the potential rule to a rule actively applied to remedy performance degradations in response to a ranking of the potential rule satisfying a threshold value based on repeated observations of the correlation between the configuration change and the performance degradation or improvement;

receiving notification of a first performance degradation;

identifying, based on configuration change criteria and degradation criteria in the learned rules, one or more configuration changes to the application relevant to the first performance degradation;

determining, based on one or more of the learned rules, whether each of the identified configuration changes satisfies a corresponding probability threshold indicating that the configuration change caused the first performance degradation; and reconfiguring the application based on one or more remediation actions specified in one or more of the learned rules if one or more of the identified configuration changes satisfies the corresponding probability thresholds.

9. The non-transitory computer readable storage medium of claim 8,
wherein a ranking of a given rule or potential rule is increased if a correlation between a configuration change and a degradation or improvement in performance associated with the given rule or potential rule is repeatedly observed,
wherein the ranking of the given rule or potential rule is decreased if the correlation between the configuration change and the degradation or improvement in performance associated with the given rule or potential rule is not repeatedly observed,
wherein the given potential rule is promoted to a rule actively used to remedy performance degradations if the ranking of the given potential rule exceeds a first threshold value, and
wherein the given rule is removed from a set of rules actively used to remedy performance degradations if the ranking of the given rule falls below a second threshold value.

10. The non-transitory computer readable storage medium of claim 8, wherein learning the rules further includes verifying that applying the rules when associated performance degradations are observed results in expected performance improvements.

11. The non-transitory computer readable storage medium of claim 8, wherein the observations of the correlation between the configuration change and the degradation or improvement in performance of the application are aggregated observations for multiple instances of the application.

12. The non-transitory computer readable storage medium of claim 8, wherein the observed configuration change is a user configuration change that undoes a previous configuration change.

13. The non-transitory computer readable storage medium of claim 8, wherein reconfiguring the application includes rolling back the one or more identified configuration changes when the corresponding probability thresholds are satisfied.

14. The non-transitory computer readable storage medium of claim 8, wherein each of the learned rules includes configuration change criteria and degradation criteria that need to be met for the rule to apply, a formula for determining probability that one or more degradations are caused by one or more configuration changes, and a probability threshold for taking remediation action to reconfigure the application.

15. A system comprising:
a processor; and
a memory, wherein the memory includes a program configured to perform operations for remedying performance degradations of an application deployed in a computer system, the operations comprising:
learning one or more rules applicable to remedy performance degradations of the application, wherein the learning of each of the rules includes:
identifying a correlation between an observed configuration change and an observed degradation or improvement in performance of the application;
creating, based on the identified correlation, a potential rule not applied to remedy performance degradations, wherein the potential rule specifies at least the application, configuration change criteria determined based on the observed configuration change, and at least one of degradation criteria or a remediation action determined based on the observed degradation or improvement, respectively; and
promoting the potential rule to a rule actively applied to remedy performance degradations in response to a ranking of the potential rule satisfying a threshold value based on repeated observations of the correlation between the configuration change and the performance degradation or improvement,
receiving notification of a first performance degradation,
identifying, based on configuration change criteria and degradation criteria in the learned rules, one or more configuration changes to the application relevant to the first performance degradation,
determining, based on one or more of the learned rules, whether each of the identified configuration changes satisfies a corresponding probability threshold indicating that the configuration change caused the first performance degradation, and
reconfiguring the application based on one or more remediation actions specified in one or more of the learned rules if one or more of the identified configuration changes satisfies the corresponding probability thresholds.

16. The system of claim 15,
wherein a ranking of a given rule or potential rule is increased if a correlation between a configuration change and a degradation or improvement in performance associated with the given rule or potential rule is repeatedly observed,
wherein the ranking of the given rule or potential rule is decreased if the correlation between the configuration change and the degradation or improvement in performance associated with the given rule or potential rule is not repeatedly observed,
wherein the given potential rule is promoted to a rule actively used to remedy performance degradations if the ranking of the given potential rule exceeds a first threshold value, and
wherein the given rule is removed from a set of rules actively used to remedy performance degradations if the ranking of the given rule falls below a second threshold value.

17. The system of claim 15, wherein each of the learned rules includes configuration change criteria and degradation criteria that need to be met for the rule to apply, a formula for determining probability that one or more degradations are caused by one or more configuration changes, and a probability threshold for taking remediation action to reconfigure the application.

* * * * *